US010182361B1

(12) United States Patent
Moon et al.

(10) Patent No.: US 10,182,361 B1
(45) Date of Patent: Jan. 15, 2019

(54) RECEIVER BEHAVIOR FOR UPLINK MULTI-USER TRANSMISSION IN WIRELESS LAN SYSTEMS

(71) Applicant: NEWRACOM, INC., Irvine, CA (US)

(72) Inventors: Sungho Moon, Irvine, CA (US); Dae Won Lee, Irvine, CA (US); Young Hoon Kwon, Irvine, CA (US); Yujin Noh, Irvine, CA (US)

(73) Assignee: NEWRACOM, INC., Lake Forest, CA (US)

( * ) Notice: Subject to any disclaimer, the term of this patent is extended or adjusted under 35 U.S.C. 154(b) by 267 days.

(21) Appl. No.: 15/094,877

(22) Filed: Apr. 8, 2016

Related U.S. Application Data

(60) Provisional application No. 62/145,447, filed on Apr. 9, 2015.

(51) Int. Cl.
*H04W 24/08* (2009.01)
*H04W 72/04* (2009.01)
*H04W 84/12* (2009.01)
*H04L 27/26* (2006.01)

(52) U.S. Cl.
CPC ......... *H04W 24/08* (2013.01); *H04L 27/2601* (2013.01); *H04W 72/0446* (2013.01); *H04W 84/12* (2013.01)

(58) Field of Classification Search
CPC combination set(s) only.
See application file for complete search history.

(56) References Cited

U.S. PATENT DOCUMENTS

2016/0156438 A1* 6/2016 Sun ................... H04L 5/0007
370/330

2016/0262050 A1* 9/2016 Merlin ................ H04L 5/0053

OTHER PUBLICATIONS

"Part 11: Wireless LAN Medium Access Control (MAC) and Physical Layer (PHY) Specifications", IEEE Standards 802.11™—2012 (Revision of IEEE Standard 802.11. 2007), Mar. 29, 2012, pp. 1-2695, IEEE (The Institute of Electrical and Electronic Engineers, Inc.), New York, NY, USA.
"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™—2013, 2013, pp. 1-395, IEEE (The Institute of Electrical and Electronic Engineers, Inc.), New York, NY, USA.
"Part 11: Wireless LAN Medium Access Control (MAC) and Physical Layer (PHY) Specifications, Amendment 2: Sub 1 GHz License Exempt Operation", IEEE P802.11 ah™/D5.0, Mar. 2015, pp. 1-604, IEEE (The Institute of Electrical and Electronic Engineers, Inc.), New York, NY, USA.

* cited by examiner

*Primary Examiner* — Yee F Lam

(57) ABSTRACT

A wireless communication device that is receiving a frame may determine whether the frame is an Up-Link Multi-User (UL MU) frame, receive the frame by performing a first procedure when the frame is determined to be the UL MU frame, and receive the frame by performing a second procedure when the frame is not determined to be the UL MU frame. Performing the first procedure may include performing a comparison of contents of a Legacy Signal (L-SIG) field of the frame to expected contents of the L-SIG field, performing a comparison of contents of a Signal A (SIG-A) field of the frame to expected contents of the SIG-A field, or both. The SIG-A field may be a High Efficiency SIG-A (HE-SIG-A) field.

18 Claims, 6 Drawing Sheets

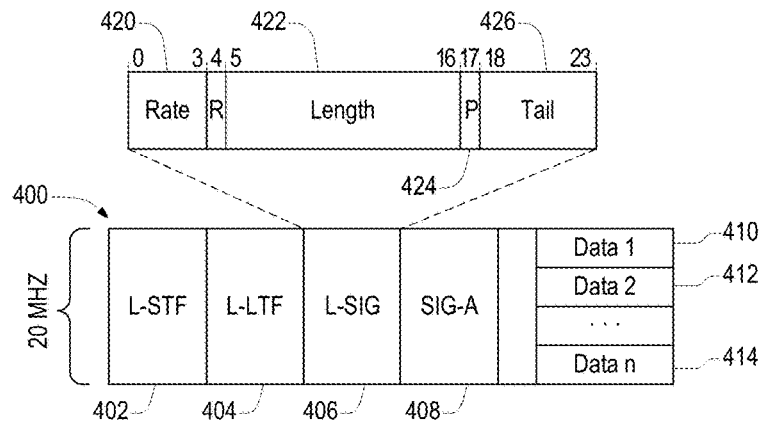
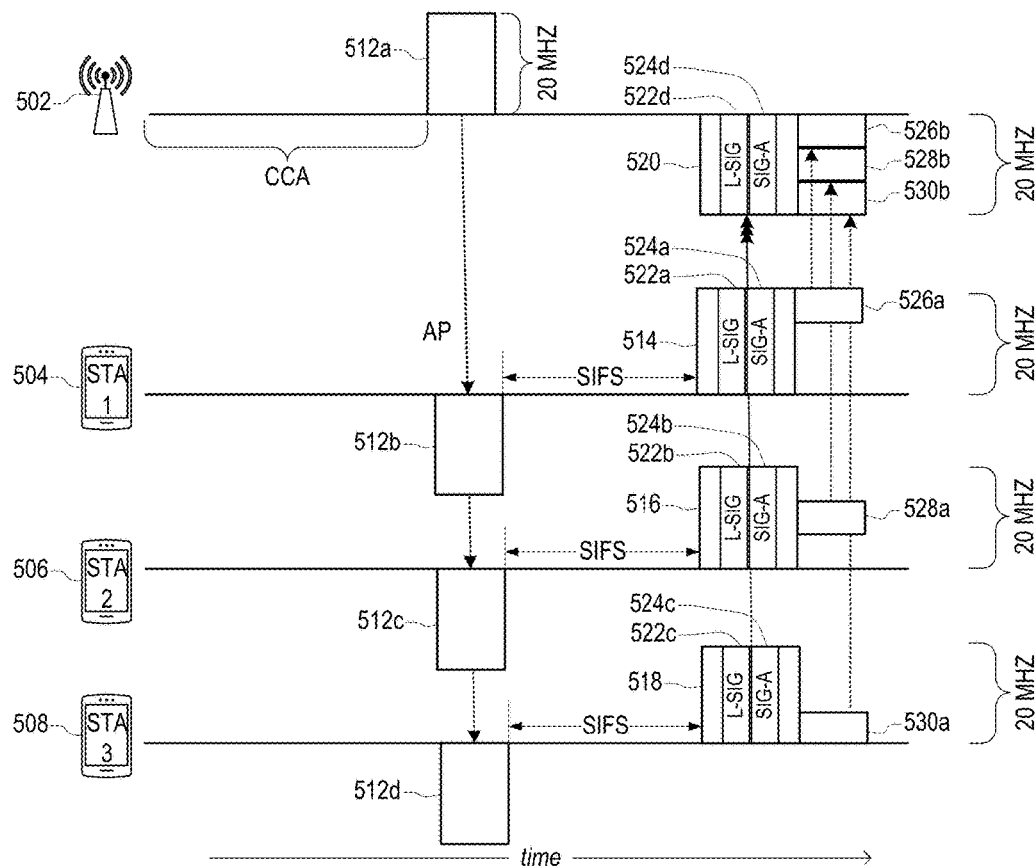

FIG. 6

Table 2. Behaviors for UL MU in HE considering both L-SIG and SIG-A

| L-SIG State | SIG-A CRC | SIG-A Comp. | Interpretation | Behavior | |
|---|---|---|---|---|---|
| 0 (Parity OK, Contents Same) | OK | Same | UL MU PPDU | Act RX.ULMU: Continue a UL MU Rx. procedure | S602 |
| | OK | Different | Third party PPDU | Option 1: Act RX.NORMAL: Continue using a RX.NORMAL procedure (non-UL-MU procedure)<br><br>Option 2: Act RX.DEFER: Defer using L-SIG.LENGTH | S604 |
| | Not OK | - | SIG-A Error | Act RX.DEFER using L-SIG.LENGTH | S606 |
| 1 (Parity OK, Contents Differ) | OK | Same | Interpretation 1: UL MU PPDU<br><br>Interpretation 2: Third party PPDU | Interpretation 1: Act RX.ULMU (rely more on SIG-A)<br><br>Interpretation 2: Act RX.NORMAL or Act RX.DEFER | S608 |
| | OK | Different | Third party PPDU | Act RX.NORMAL or Act RX.DEFER | S610 |
| | Not OK | - | SIG-A Error | Act RX.DEFER | S612 |
| 2 Parity Not OK | OK | Same | Interpretation 1: UL MU PPDU<br><br>Interpretation 2: L-SIG Error | Interpretation 1: Act RX.ULMU (rely more on SIG-A)<br><br>Interpretation 2: Back to CCA | S614 |
| | OK | Different | L-SIG Error | Back to CCA | S616 |
| | Not OK | - | L-SIG & SIG-A Error | Back to CCA | S618 |

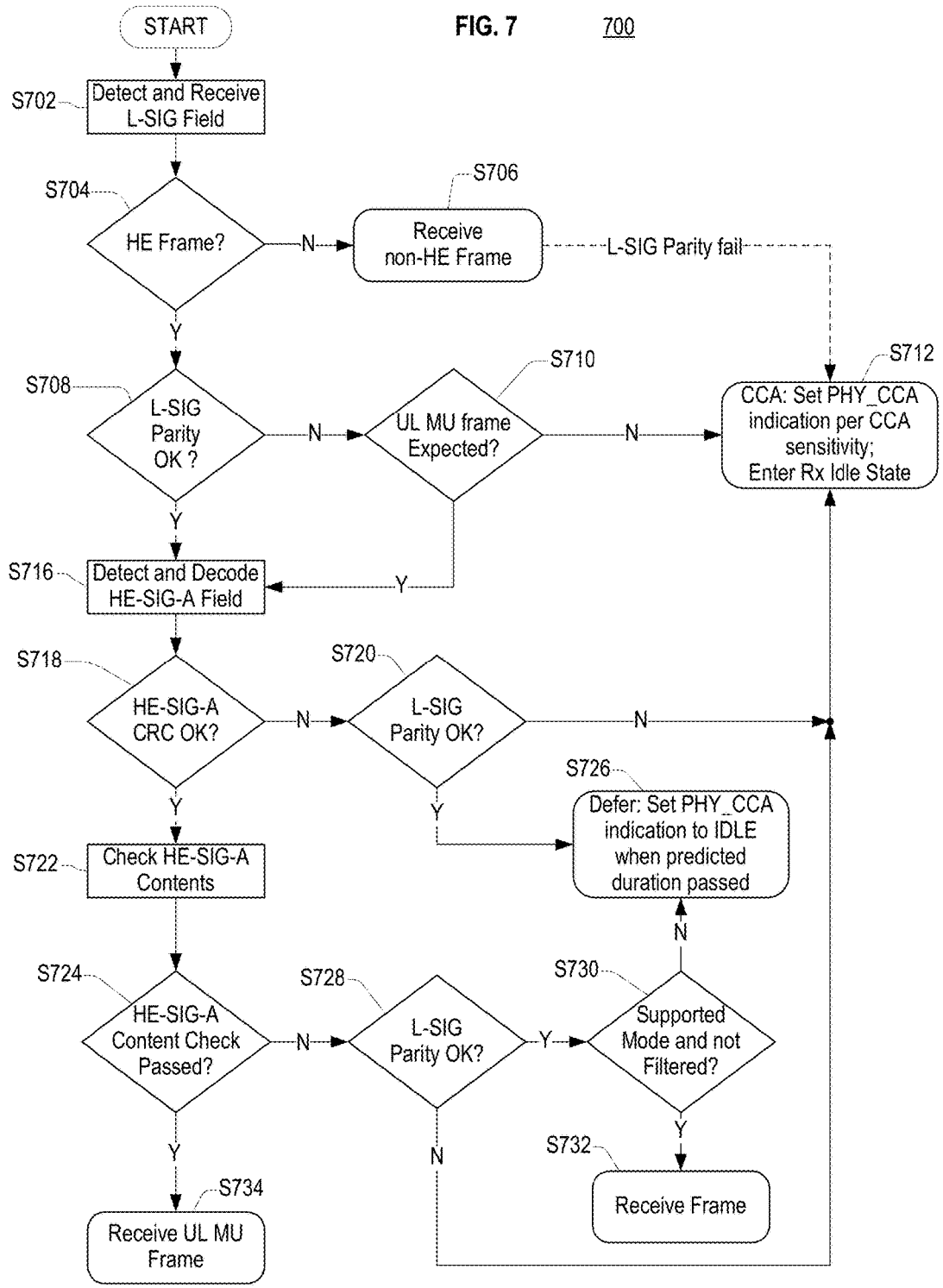

RECEIVER BEHAVIOR FOR UPLINK MULTI-USER TRANSMISSION IN WIRELESS LAN SYSTEMS

CROSS-REFERENCE TO RELATED APPLICATION

This application claims the benefit of U.S. Provisional Application No. 62/145,447, filed on Apr. 9, 2015, the contents of which are incorporated herein by reference.

BACKGROUND

1. Technical Field

The technology described herein relates generally to wireless networking. More particularly, the technology relates to determining a validity of a received Up-Link (UL) Multi-User (MU) frame in a Wireless Local Area Network (WLAN).

2. Description of the Related Art

Wireless LAN (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (hereinafter, IEEE Std 802.11n). The IEEE Std 802.11 was subsequently amended by IEEE Std 802.11ac™-2012, IEEE Std 802.11aa™-2012, IEEE Std 802.11ad™-2012, and IEEE Std 802.11ac™-2013 (hereinafter, IEEE 802.11ac).

Recently, an amendment focused on providing a High Efficiency (HE) WLAN in high-density scenarios is being developed by the IEEE 802.11ax task group. The 802.11ax amendment focuses on improving metrics that reflect user experience, such as average per station throughput, the 5th percentile of per station throughput of a group of stations, and area throughput. Improvements will be made to support environments such as wireless corporate offices, outdoor hotspots, dense residential apartments, and stadiums.

An HE WLAN supports Up-Link Multi-User transmission such as Orthogonal Frequency Division Multiple Access (UL MU OFDMA) and Multi-User Multi-Input-Multi-Output. In the UL MU transmission, an Access Point (AP) may transmit a trigger frame to a plurality of stations. In response, the plurality of stations simultaneously transmit respective UL MU transmission frames to the AP.

Each of the UL MU OFDMA frames transmitted by the stations may include a first portion transmitted across an entire bandwidth of a wireless channel and a second portion transmitted using only part of the bandwidth of the wireless channel. The respective first portions of the UL MU OFDMA frames are transmitted using a same range of frequencies (that is, using the same subchannels) as each other. In contrast, the respective second portions of the UL MU OFDMA frames are each transmitted using respective ranges of frequencies (that is, respective subchannels) allocated exclusively to each second portion.

Because an UL MU transmission frame is substantially different from other types of frames (for example, Single User (SU) frames, Down-link (DL) frames, broadcast frames, and the like), the behavior of a device when the device receives an UL MU transmission frame may differ from the behavior of a device when the device receives a frame that is not an UL MU transmission frame.

SUMMARY

In an embodiment, a method implemented by a wireless communication device for receiving a frame comprises determining, by the wireless communication device, whether a frame is an Up-Link Multi-User (UL MU) frame, receiving the frame by performing a first procedure when the frame is determined to be the UL MU frame, and receiving the frame by performing a second procedure when the frame is not determined to be the UL MU frame. Performing the first procedure includes performing a comparison of contents of a Legacy Signal (L-SIG) field of the frame to expected contents of the L-SIG field of the frame, performing a comparison of contents of a Signal A (SIG-A) field of the frame to expected contents of the SIG-A field of the frame, or both.

In an embodiment, the method further comprises transmitting, by the wireless communication device, a trigger frame, and determining the frame to be the UL MU frame when a reception of the frame by the wireless communication device begins a Short Inter-Frame Space (SIFS) after a completion of the transmission of the trigger frame.

In an embodiment, the method further comprises performing a validity check of the L-SIG field of the frame, and determining whether the frame is the UL MU frame according to a result of the validity check of the L-SIG field.

In an embodiment, performing the validity check of the L-SIG field includes comparing contents of the L-SIG field to expected contents of the L-SIG field. The contents of the L-SIG field include a content of a length field, a content of a rate field, or both.

In an embodiment, the method further comprises performing a validity check of the SIG-A field of the frame, and determining whether the frame is the UL MU frame according to a result of the validity check of the SIG-A field.

In an embodiment, the SIG-A field includes a High Efficiency (HE) Signal A (HE-SIG-A) field.

In an embodiment, performing the validity check of the SIG-A field includes comparing the contents of the SIG-A field to the expected contents of the SIG-A field. The contents of the SIG-A field include contents of one or more of a) a bandwidth field indicating an operating bandwidth, b) an indication bit indicating whether the frame is the UL-MU transmission or not, or whether the frame is UL transmission or DL transmission (frame format indication), c) a Basic Service Set (BSS) Color field indicating an identifier of the BSS which the frame belongs to, d) a Spatial Reuse field indicating Clear Channel Assessment (CCA) level, interference level accepted, or TX power, e) an STBC field indicating whether the response frame applies Space Time Block Coding (STBC), f) a Group ID field indicating a group which includes a STA related to the response frame, g) an NSTS field indicating a number of space-time streams, h) a Coding field indicating a coding type of the response frame, i) a Modulation and Coding Scheme (MCS) field indicating a MCS of the response frame, j) a beamforming field indicating if the response frame applies beamforming, k) a Transmission Opportunity (TXOP) Duration field indicating the remaining time in the current TXOP, and 1) a GI field indicting a type of a length of a Cyclic Prefix (CP) of the response frame.

In an embodiment, the method further comprises transmitting, by the wireless communication device, a trigger frame. The trigger frame includes an indication of the expected contents of the SIG-A field.

In an embodiment, the method further comprises determining the frame is the UL MU frame when the contents of the SIG-A field match the expected contents of the SIG-A field, and determining the frame is not the UL MU frame when the contents of the SIG-A field are different from the expected contents of the SIG-A field.

In an embodiment, the method further comprises performing a validity check of the L-SIG field of the frame, and determining the frame is a third-party frame when a result of the validity check of the L-SIG field indicates that the contents of the L-SIG field match the expected contents of the L-SIG field and the contents of the SIG-A field are different than the expected contents of the SIG-A field.

In an embodiment, the method further comprises performing a validity check of the L-SIG field of the frame, and determining the frame is a third-party frame when a result of the validity check of the L-SIG field indicates that the contents of the L-SIG field do not match the expected contents of the L-SIG field.

In an embodiment, the method further comprises determining that the frame is the UL MU frame when i) the result of the validity check of the L-SIG field indicates that the contents of the L-SIG field do not match the expected contents of the L-SIG field, and ii) a length indicated in the frame is longer than an expected length of the frame. The method further comprises determining that the frame is the third-party frame when the result of the validity check of the L-SIG field indicates that the contents of the L-SIG field do not match the expected contents of the L-SIG field and a length indicated in the frame is not longer than an expected length of the frame.

In an embodiment, the method further comprises transmitting, by the wireless communication device, a trigger frame, and determining that the frame is not the UL MU frame when i) a reception of the frame by the wireless communication device begins a Short Inter-Frame Space (SIFS) after a completion of the transmission of the trigger frame, ii) the validity check of the L-SIG field indicates that the contents of the L-SIG field are different than the expected contents of the L-SIG field, and iii) the contents of the SIG-A field are different than the expected contents of the SIG-A field.

In an embodiment, the method further comprises performing a validity check of the L-SIG field of the frame, and determining that an error has occurred according to a result of the validity check of the L-SIG field.

In an embodiment, the method further comprises determining that an error has occurred when the contents of the SIG-A field are different from the expected contents of the SIG-A field.

In an embodiment, the method further comprises performing a parity check of the L-SIG field of the frame, and performing the first procedure when the frame is determined to be the UL MU frame and a result of the parity check of the L-SIG field indicates a parity error.

In an embodiment, the method further comprises indicating, using an indication included in an High Efficiency Signal A (HE-SIG-A) field, that the wireless communication device may perform the first procedure.

In an embodiment, the method further comprises performing a comparison of a length indicated in the frame to an expected length, and determining whether to wait to an end of a current communication according to a result of the comparison.

In an embodiment, the frame is an Orthogonal Frequency Division Multiple Access (OFDMA) frame.

In an embodiment, the L-SIG field of the frame and the SIG-A field of the frame are a result of an air combination of a plurality of transmitted frames, the plurality of transmitted frames being respectively transmitted by a plurality of wireless devices.

BRIEF DESCRIPTION OF THE DRAWINGS

FIG. 4 illustrates an Orthogonal Frequency Division Multiple Access (OFDMA) frame according to an embodiment.

FIG. 5 illustrates an Up-Link (UL) Multi-User (MU) OFDMA operation according to an embodiment.

FIG. 6 is a table indicating behaviors according to an embodiment.

FIG. 7 illustrates a process for receiving a frame according to an embodiment.

DETAILED DESCRIPTION

Figure 1:
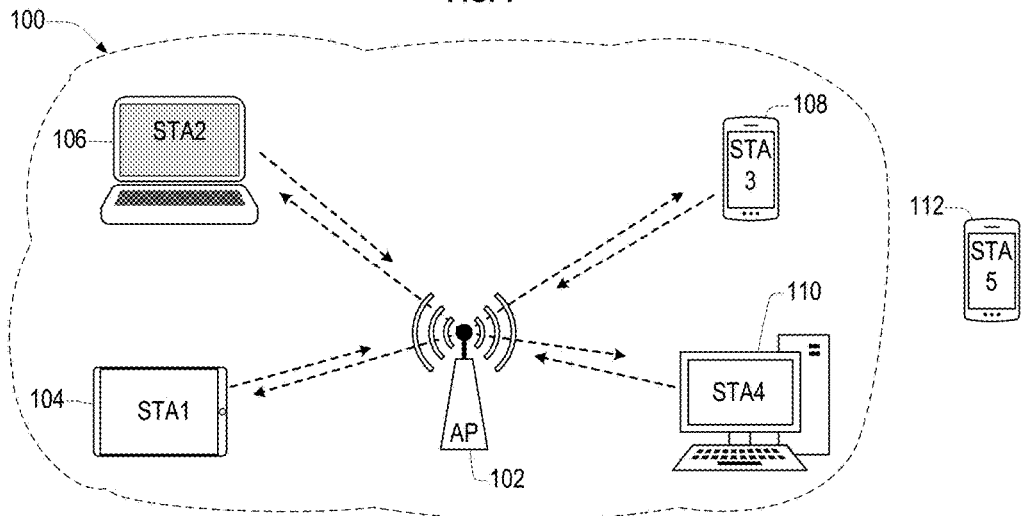
FIG. 1 illustrates a wireless network according to an embodiment.

Embodiments of the present disclosure relate generally to wireless networking, and more particularly, to behaviors of a wireless device when receiving an Up-Link (UL) Multi-User (MU) Orthogonal Multi-Frequency Multiple Access (OFDMA) frame.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless network may include a plurality of wireless communication devices organized as an infrastructure Basic Service Set (BSS) 100 of a Wireless Local Area Network (WLAN). In an 802.11 wireless LAN, the BSS provides the basic building block and typically includes an access point (AP) and one or more associated stations (STAs). In FIG. 1, the BSS 100 includes an Access Point 102 (also referred to as AP) wirelessly communicating with first, second, third, and fourth wireless devices (or stations) 104, 106, 108, and 110 (also referred to as STA1, STA2, STA3, and STA4, respectively) associated with the AP 102. The wireless devices may each include a medium access control layer (MAC) and a physical layer (PHY) according to an IEEE 802.11 standard.

FIG. 1 also shows a fifth station 112 (STA5) that is not associated with the AP 102, that is, which is not part of the BSS 100.

Although the example of FIG. 1 shows only the BSS 100 including only the first to fourth stations STA1 to STA4, embodiments are not limited thereto and may comprise BSSs including any number of STAs.

The AP 102 is a station, that is, a STA, configured to control and coordinate functions of the BSS 100. The AP 102 may transmit information to a single station selected from the plurality of stations STA1 to STA4 in the BSS 100 using a single frame, or may simultaneously transmit information to two or more of the stations STA1 to STA4 in the BSS 100 using either a single Orthogonal Frequency Division Multiplexing (OFDM) broadcast frame, a single OFDM Multi-User Multi-Input-Multi-Output (MU-MIMO) transmission, or a single Orthogonal Frequency Division Multiple Access (OFDMA) frame.

The stations STA1 to STA4 may each transmit data to the AP 102 using a single frame, or transmit information to and receive information from each other using a single frame. Two or more of the stations STA1 to STA4 may simultaneously transmit data to the AP 102 using an Uplink (UL) OFDMA frame. When the BSS 100 supports Spatial Division Multiple Access (SDMA), two or more of the stations STA1 to STA4 may simultaneously transmit data to the AP 102 using an UL MU-MIMO frame.

In another embodiment, the AP 102 may be absent and the stations STA1 to STA4 may be in an ad-hoc network.

Each of the stations STA1 to STA5 and the AP 102 includes a processor and a transceiver, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium. The transceiver represents a unit functionally connected to the processor, and designed to transmit and receive a frame through the wireless network.

The transceiver may include a single component that performs the functions of transmitting and receiving, or two separate components each performing one of such functions. The processor and the transceiver may be implemented in each of the stations STA1 to STA5 and the AP 102 using respective hardware components, software components, or both.

The AP 102 may be or may include a WLAN router, a stand-alone Access Point, a WLAN bridge, a Light-Weight Access Point (LWAP) managed by a WLAN controller, and the like. In addition, a device such as a personal computer, tablet computer, or cellular phone may be able to operate as the AP 102, such as when a cellular phone is configured to operate as a wireless "hot spot."

Each of the stations STA1 to STA5 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but is not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

Each frame's type and subtype may be identified using a type field and a subtype field included in a control field of the frame, as prescribed in the applicable standard.

Figure 2:
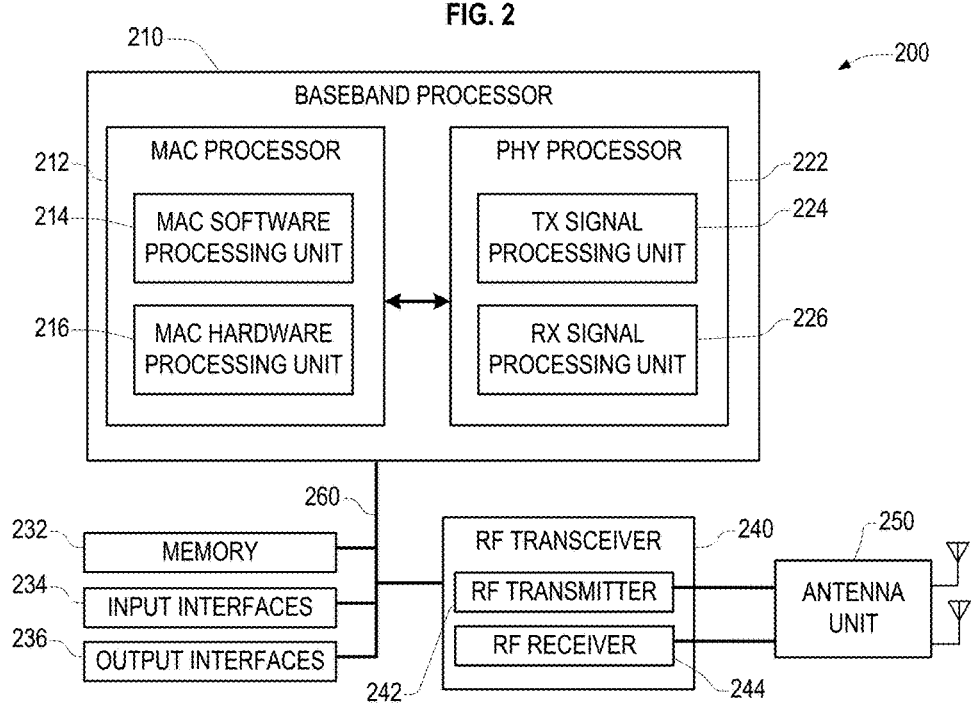
FIG. 2 is a schematic diagram of a wireless device according to an embodiment.

FIG. 2 illustrates a schematic block diagram of a wireless device 200 according to an embodiment. The wireless or WLAN device 200 can represent any device in a BSS, e.g., the AP 102 or any of the stations STA1 to STA5 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the storage device 232, which may include a non-transitory computer readable medium having software (e.g., computer programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware, hereinafter referred to as "MAC hardware." However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit 224 and a receiving signal processing unit 226. The PHY processor 222 implement a plurality of functions of the PHY layer. These functions may be performed in software, hardware, or a combination thereof according to implementation.

Functions performed by the transmitting signal processing unit 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beam-formed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, touch screen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3A:
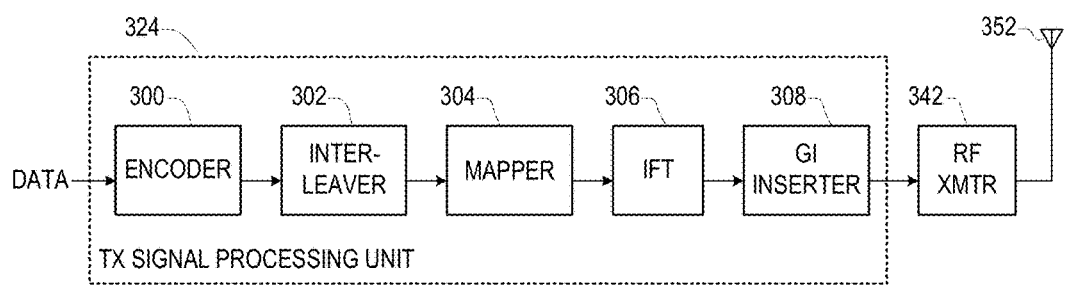
FIG. 3A illustrates components of a wireless device configured to transmit data according to an embodiment.

FIG. 3A illustrates components of a wireless device configured to transmit data according to an embodiment, including a Transmitting (Tx) Signal Processing Unit (TxSP) 324, an RF transmitter 342, and an antenna 352. In an embodiment, the TxSP 324, the RF transmitter 342, and the antenna 352 correspond to the transmitting signal processing unit 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data DATA. In an embodiment, the encoder 300 includes a forward error correction (FEC) encoder. The FEC encoder may include a binary convolutional code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs the BCC encoding, and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to the constellation mapping.

When the TxSP 324 performs a MIMO or MU-MIMO transmission, the TxSP 324 may include a plurality of interleavers 302 and a plurality of mappers 304 according to a number NSS of spatial streams of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number NSTS of space-time streams and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IIFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
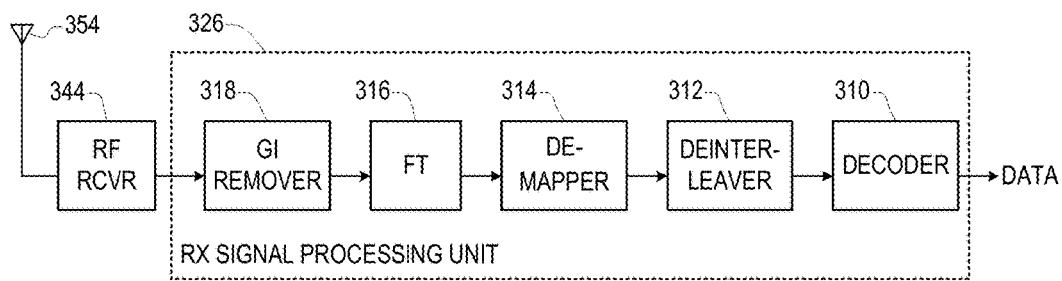
FIG. 3B illustrates components of a wireless device configured to receive data according to an embodiment.

FIG. 3B illustrates components of a wireless device configured to receive data according to an embodiment, including a Receiver (Rx) Signal Processing Unit (RxSP) 326, an RF receiver 344, and an antenna 354. In an embodiment, the RxSP 326, RF receiver 344, and antenna 354 may correspond to the receiving signal processing unit 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using the LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using the BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs the BCC decoding, the RxSP 326 may further include an encoder deparser for multiplexing the data decoded by a plurality of BCC decoders. When the decoder 310 performs the LDPC decoding, the RxSP 326 may not use the encoder deparser.

FIG. 4 illustrates an Orthogonal Frequency Division Multiple Access (OFDMA) frame 400 according to an embodiment. The OFDMA frame 400 may be a Down-Link (DL) Multi-User (MU) OFDMA frame transmitted by the AP 102 or may be an Up-Link (UL) MU OFDMA frame transmitted by one or more of the stations STA1 to STA4 of the WLAN BSS 100 of FIG. 1. The OFDMA frame 400 may also be a frame transmitted by the fifth station STA5 of FIG. 1, which is not part of the WLAN BSS 100.

In the embodiment shown in FIG. 4, the OFDMA frame 400 is transmitted using a 20 MHZ bandwidth, but embodiments are not limited thereto. Embodiments of the OFDMA frame 400 may be transmitted using any of a 40 MHz bandwidth, an 80 MHz bandwidth, an 80+80 MHz bandwidth, and a 160 MHz bandwidth.

The OFDMA frame 400 includes a legacy header including a Legacy Short Training Field (L-STF) 402, a Legacy Long Training Field (L-LTF) 404, and a Legacy Signal field (L-SIG) 406. The L-STF 402 and L-LTF 404 are used to identify the frame and for synchronization.

The L-SIG 406 may include a 4-bit rate field 420 in bits 0-3, a reserved bit in bit 4, a 12-bit length field 424 in bits 4-16, and a parity bit 424 in bit 17. The parity bit 424 is an even parity bit for bits 0-16 of the L-SIG 406. The L-SIG also includes a 6-bit Tail field in bits 18-23 that may be all zeros.

The OFDMA frame 400 further includes a Signal-A field (SIG-A) 408. In an embodiment, the SIG-A 408 is a High Efficiency SIG-A (HE-SIG-A) field.

Each of the L-STF 402, the L-LTF 404, the L-SIG 406 and the SIG-A 408 is transmitted using a 20 MHz bandwidth. When the OFDMA frame 400 is transmitted using a bandwidth greater than 20 MHz, each of the L-STF 402, the L-LTF 404, the L-SIG 406 and the SIG-A 408 is duplicated within each 20 MHz portion of the bandwidth used to transmit the OFDMA frame 400.

When the OFDMA frame 400 is an UL MU OFDMA frame of an UL MU operation, each stations participating in the UL MU operation transmits each of the L-STF 402, the L-LTF 404, the L-SIG 406 and the SIG-A 408 using the 20 MHz bandwidth, and duplicates transmits copies of the L-STF 402, the L-LTF 404, the L-SIG 406 and the SIG-A 408 using the additional 20 MHz portions of the bandwidth of the OFDMA frame 400 when the bandwidth of the OFDMA frame 400 which each station transmits is greater than 20 MHz.

The OFDMA frame 400 further includes first, second, and n-th data 410, 412, and 414. The data 410, 412, and 414 are simultaneously transmitted using respective unique portions of the bandwidth of the OFDMA frame. The data 410, 412, and 414 may each be intended to be received by a respective station when the OFDMA frame 400 is a DL frame. The data 410, 412, and 414 may each be transmitted by a respective station when the OFDMA frame 400 is a UL frame.

FIG. 5 illustrates an UL MU OFDMA operation 500 according to an embodiment. The operation 500 is illustrated being performed by an Access Point (AP) 502 and first, second, and third stations 504, 508, and 508. In an embodiment, the AP 502 and stations 504, 506, and 508 may correspond to the AP 102 and stations 104, 106, and 108 of BSS 100 of FIG. 1.

In FIG. 5, a frame transmitted by a device appears immediately above a line corresponding to the device, and a frame received by the device appears immediately below the line corresponding to the device.

The UL MU OFDMA operation 500 is illustrated as including three stations and transmissions having 20 MHz bandwidths, but embodiments are not limited thereto. Embodiments of the UL MU OFDMA operation 500 may include 1, 2, 4, or more stations and may include transmissions having any one of 20 MHz, 40 MHz, 80 MHz, 80+80 MHz, and 160 MHz bandwidths.

The UL MU OFDMA operation 500 includes a transmission of a trigger frame 512a and transmissions of first, second, and third response frames 514, 516, and 518 as responses to the trigger frame 512a.

Before the UL MU OFDMA operation 500 begins, the AP 502 performs a Clear Channel Assessment (CCA) of one or more channels to be used in the UL MU OFDMA operation 500. The CCA includes monitoring RF energy in the one or more channels to determine whether another device is using the channel. After the one or more channels have been detected as continuously idle for a predetermined period of time, the AP 502 may initiate the UL MU OFDMA operation 500. In an embodiment, the predetermined period of time is a Distributed Coordination Function (DCF) InterFrame Space (DIFS).

To initiate the UL MU OFDMA operation 500, the AP 502 transmits a trigger frame 512a. The trigger frame 512a includes indications that the stations 504, 506, and 508, respectively, are to participate in the UL MU OFDMA operation 500.

The trigger frame 512a includes information regarding the contents of respective L-SIG fields to be transmitted by the stations 504, 506, and 508 in the respective response frames 514, 516, and 518 transmitted in response to the trigger frame 512a. For example, the trigger frame 512a may include information regarding the contents of a rate field, a length field, or both of the L-SIG fields of the respective response frames 514, 516, and 518 transmitted by the stations 504, 506, and 508. The information regarding the contents of the L-SIG field may be identical for all of the response frames 514, 516, and 518.

The trigger frame 512a may also include information regarding the contents of respective SIG-A fields, such as an HE-SIG-A field, to be transmitted by the stations 504, 506, and 508 in the respective response frames 514, 516, and 518. For example, the trigger frame 512a may include information regarding the contents of a one or more of the following fields of the SIG-A fields of the response frames 514, 516, and 518: a bandwidth field indicating an operating bandwidth, an STBC field indicating whether the response frame applies Space Time Block Coding (STBC), a Group ID field indicating a group which includes a STA related to the response frame, a NSTS field indicating a number of space-time streams, a Coding field indicating a coding type of the response frame, a Modulation and Coding Scheme (MCS) field indicating a MCS of the response frame, a beamforming field indicating if the response frame applies beamforming, and a GI field indicting a type of a length of a Cyclic Prefix (CP) of the response frame. The information regarding the contents of the SIG-A field may be identical for all of the response frames 514, 516, and 518.

The trigger frame 512a may also include respective allocation information for data payloads to be respectively transmitted by the stations 504, 506, and 508 in respective response frames 514, 516, and 518. The allocation information may allocate respective portions of the bandwidth of the response frames 514, 516, and 518 as being for the exclusive use of each of the stations 504, 506, and 508 for a portion of the time of the transmission of the response frames 514, 516, and 518.

The stations 504, 506, and 508 receive respective first, second, and third received trigger frames 512b, 512c, and 512d corresponding to the trigger frame 512a as propagated through the respective wireless channels between the stations 504, 506, and 508 and the AP 502.

A predetermined period of time after the end of reception of the received trigger frames 512b, 512c, and 512d, the stations 504, 506, and 508 transmit the respective first, second, and third response frames 514, 516, and 518. In an embodiment, the predetermined period of time is a Short Inter-Frame Space (SIFS). The response frames 514, 516, and 518 may be UL MU OFDMA frames.

The first, second, and third response frames 514, 516, and 518 include first, second, and third L-SIG fields 522a, 522b, and 522c, respectively. The first, second, and third response frames 514, 516, and 518 also include first, second, and third SIG-A fields 524a, 524b, and 524c, respectively. The L-SIG fields 522a, 522b, and 522c and SIG-A fields 524a, 524b, and 524c are transmitted using a same 20 MHz bandwidth of the response frames 514, 516, and 518.

The first response frame 514 includes first data 526a transmitted using a first portion of the 20 MHz bandwidth. The second response frame 516 includes second data 528a transmitted using a second portion of the 20 MHz bandwidth. The third response frame 518 includes third data 530a transmitted using a third portion of the 20 MHz bandwidth.

The first, second, and third portions of the 20 MHz bandwidth do not overlap. That is, each of the first, second, and third portions of the 20 MHz bandwidth includes only a range of frequencies (that is, a number of subchannels) that are not present in any of the other portions.

The response frames 514, 516, and 518 propagate to the AP to produce a received response frame 520. The received response frame 520 includes a received L-SIG field 522d, a received SIG-A field 524d, and first, second, and third received data 526b, 528b, and 530b.

The received L-SIG field 522d corresponds to a result of air-combining the first, second, and third L-SIG fields 522a, 522b, and 522c of the first, second, and third response frames 514, 516, and 518 respectively. That is, because the first, second, and third L-SIG fields 522a, 522b, and 522c are transmitted concurrently (that is, in the same time) and using the same 20 MHz bandwidth, RF signals corresponding to the first, second, and third L-SIG fields 522a, 522b, and 522c combine in the channel (that is, in the air) near the AP to produce combined RF signals that are received as the received L-SIG field 522d.

The first, second, and third L-SIG fields 522a, 522b, and 522c air-combine to produce a received L-SIG field 522d having identical contents to each of the first, second, and third L-SIG fields 522a, 522b, and 522c when the first, second, and third L-SIG fields 522a, 522b, and 522c have identical contents and are transmitted using the same frequencies and the same modulation and coding techniques.

Similarly, the received SIG-A field 524d corresponds to a result of air-combining the first, second, and third SIG-A fields 524a, 524b, and 524c of the first, second, and third response frames 514, 516, and 518 respectively. The first, second, and third SIG-A fields 524a, 524b, and 524c air-combine to produce a received SIG-A field 524d having identical contents to each of the first, second, and third SIG-A fields 524a, 524b, and 524c when the first, second, and third SIG-A fields 524a, 524b, and 524c have identical contents and are transmitted using the same frequencies and the same modulation and coding techniques.

In an embodiment, in order to ensure that reliability of the air-combining processes, the AP 502 transmits an indication or information to each of the stations 504, 506, and 508 participating in the UL MU OFDMA operation that causes all or some of the information transmitted in each of the L-SIG fields 522a, 522b, and 522c to be the same as the corresponding information in the other L-SIG fields 522a, 522b, and 522c, and causes all or some of the information transmitted in each of the SIG-A fields 524a, 524b, and 524c to be same as the corresponding information in the other SIG-A fields 524a, 524b, and 524c.

In an embodiment, the trigger frame 512a transmitted by the AP 502 includes or indicates information of the L-SIG fields 522a, 522b, and 522c that is the same in each. In an embodiment, the trigger frame 512a includes or indicates in the trigger frame 512a information of the SIG-A fields 524a, 524b, and 524c that is the same in each.

The data 526a, 528a, and 530a transmitted in the response frames 514, 516, and 518 respectively is frequency-multiplexed and is therefore not air-combined. As a result, the received response frame 520 includes received data 526b, 528b, and 530b respectively corresponding to the data 526a, 528a, and 530a.

Because the AP 502 knows what some or all of the information in the received L-SIG field 522d and the received SIG-A field 524d should be, a behavior of the AP 502 when receiving a frame after sending the trigger frame 512a may be different than a behavior of other devices receiving the frame, and in particular may be different than behaviors of a Very High Throughput (VHT) receiver according to the IEEE 802.11ac standard and different than behaviors of a High Throughput (HT) receiver according to the IEEE 802.11n standard.

In the VHT receiver, the VHT receiver shall determine the validity of an L-SIG field of a received frame. When the L-SIG field is valid, the VHT receiver shall determine the validity of a VHT-SIG-A field of the received frame, otherwise, the VHT receiver shall signal an error condition using, for example, a PHY-RXEND.indication(FormatViolation) primitive.

The HT receiver has a different behavior than the VHT receiver. In the HT receiver, the HT receiver does not check the validity of the L-SIG field. After detecting the L-SIG field, the HT receiver shall begin receiving training symbols and searching for a High Throughput Signal (HT-SIG) field without checking the L-SIG field. The HT receiver is able to ignore the validity of the L-SIG field because the HT-SIG field provides length information of the received frame.

The receiver in an HE WLAN (that is, an HE receiver operating according to the IEEE 802.11ax amendment) can have two different receiver behaviors: 1) a behavior for Down-Link (DL) Single-User (SU) transmissions, DL Multi-User (MU) transmissions, and Up-Link (UL) SU transmissions, collectively referred to as non-UL-MU transmissions, and 2) a behavior for UL MU transmissions. A difference between non-UL-MU transmissions and UL MU transmissions is that UL MU transmissions are triggered, and a station triggering a UL MU transmission (a triggering station) knows some or all of information that should be sent back in the UL MU transmission transmitted by triggered stations in response to the trigger.

As a result, when the HE receiver is the triggering station of an UL MU transmission, the HE receiver may perform validity checks of an L-SIG field, a SIG-A field, or both of a received frame to determine whether the received frame is a valid triggered UL MU transmission sent in response to the HE receiver's triggering.

In an embodiment, a frame may include an indication bit indicating whether the received frame is the non-UL-MU transmission or the UL-MU transmission.

Since the HE receiver that triggered the UL MU transmission already knows all or part of the L-SIG field information and SIG-A field information which is going to be sent by the stations participating in the UL MU transmission, an additional validity check for the L-SIG field and the SIG-A field of the UL MU transmission may be performed.

In contrast to IEEE 802.11n and IEEE 802.1ac WLANs, which determine the validity of an L-SIG field and a SIG-A field using only a parity bit or CRC respectively, in an HE WLAN the HE receiver may, to determine the validity of the UL MU transmission, perform a content-comparison for the L-SIG field, a content-comparison for the SIG-A field, or both, which is a behavior not present in IEEE 802.11n and IEEE 802.11ac devices. Here the content-comparison is an act of full or partial comparison between i) contents which, for example, were sent or prescribed in an L-SIG field, a SIG-A field, or both of a trigger frame, and ii) contents of an L-SIG field, a SIG-A field, or both of a UL MU frame for which reception commenced within a predetermined time (for example, a SIFS) after the completion of the transmission of the trigger frame.

With this validity check procedure in an HE receiver, an additional state of a received L-SIG field or received SIG-A field can be determined when an the HE receiver (such as an AP) which triggered a UL MU transmission checks the received L-SIG field or received SIG-A field. Table 2, below, shows states that can be determined for the received L-SIG field.

TABLE 2

| L-SIG State | Parity Check | Comparison Check | Interpretation |
| --- | --- | --- | --- |
| 0 | OK | Same | Valid L-SIG |
| 1 | OK | Different | Valid in legacy behavior but not valid in UL MU frame |
| 2 | Not OK | Not Applicable | L-SIG Error (may be able to proceed anyway in UL MU) |

A State 0 corresponds to the received L-SIG field passing a parity check (that is, having a correct parity bit) and having a same content as an expected content of the triggering HE receiver. A State 1 corresponds to the received L-SIG field passing the parity check and having a different content than the expected content. A State 2 corresponds to the received L-SIG field not passing the parity check. In an embodiment, because the received L-SIG field not passing the parity check indicates that the contents of the L-SIG may be unreliable, the triggering HE receiver may not perform the comparison check on the received L-SIG field when the received L-SIG field fails the parity check.

The State 1 may be determined in the HE receiver and not determined in HT receivers or VHT receivers. Accordingly, an HE receiver (such as an AP of an HE WLAN) may have behaviors corresponding to the received L-SIG field having the State 1 that are not present in HT receivers or VHT receivers (such as APs of previous 802.11 systems.)

Furthermore, while the L-SIG field having the State 2 may be determined by HT receivers or VHT receivers, an HE receiver may have a different behavior in response to the L-SIG field having the State 2 than HT receivers or VHT receivers because the information that should be communicated using the L-SIG field is already known to the HE receiver when the L-SIG field is of an UL MU frame transmitted in response to a trigger frame transmitted by the HE receiver. Therefore, the HE receiver (such as an AP of an HE WLAN) may continue to process the received frame (including, for example, processing a SIG-A field of the frame) even when the L-SIG field has the State 2.

An L-SIG may include 4 bits of RATE, 12 bits of LENGTH, 1 bit of Parity, and 6 bits of Tail. In an embodiment, the HE receiver may perform the comparison check of the L-SIG by comparing the LENGTH bits, the RATE bits, or both to respective expected values.

A SIG-A field has a Cycle Redundancy Check (CRC) value instead of a parity bit. Accordingly, a validity check of a SIG-A field may include a CRC instead of the parity check of the L-SIG field.

A comparison check for a SIG-A may compare one or more fields of the SIG-A field against respective expected values. The details of the comparison check for the SIG-A field may depends on a design of an HE-SIG-A field.

In an embodiment, a comparison check for a SIG-A field of a received frame may compare, to corresponding expected values, one or more fields of the SIG-A field such as:

a bandwidth field indicating an operating bandwidth,
an indication bit indicating whether the frame is the UL-MU transmission or not, or whether the frame is UL transmission or DL transmission (frame format indication),
a Space Time Block Coding (STBC) field indicating whether the Physical Layer Convergence Procedure (PLCP) Protocol Data Unit (PPDU), that is, the frame, applies STBC, a Group ID field indicating a group which includes a STA related to the received frame, a BSS Color field indicating an identifier of the BSS which the frame belongs to, a Spatial Reuse field indicating CCA level, interference level accepted or TX power, a NSTS field indicating a number of streams of a single or multiple STAs, a Coding field indicating a coding type of the received frame, a Modulation and Coding Scheme (MCS) field indicating an MCS of a single or multiple STAs, a beamforming field indicating if the received frame applies beamforming, a GI field indicting a type of a length of CP, and a TXOP Duration field indicating the remaining time in the current TXOP.

The comparison check may determine that the contents of the SIG-A field are the same when all of the compared contents of the SIG-A field match, and may determine that the contents of the SIG-A field are different when any one of the compared contents do not match.

When an HE receiver that initiated (that is, triggered) an UL MU transmission receives a received L-SIG field or a received SIG-A field that passes a respective parity check or CRC but fails a comparison check of the contents, the HE receiver may have different receiver behaviors for various cases.

FIG. 6 includes a Table 2 indicating behaviors when the HE receiver, having initiated reception of a received frame within a predetermined period of time (such as a SIFS) of the HE receiver sending out a trigger frame, considers both the L-SIG and SIG-A fields of the received frame for validity checks, according to an embodiment. The HE receiver may be an HE AP operating in a BSS of an HE WLAN.

Table 2 shows three states that may be determined by the L-SIG validity check, as shown in Table 1, above. For each L-SIG validity state, Table 2 shows three similar states that may be determined by a SIG-A validity check.

At S602, when the L-SIG field has the State 0 (indicating that the L-SIG field parity was correct and that the contents of the L-SIG field are as expected) and the SIG-A field passes a CRC and a comparison check, the HE receiver determines that the received frame is an UL MU PPDU. Accordingly, after detecting and verifying the validity of the SIG-A field, a PHY entity of the HE receiver may begin receiving the symbols that follow the SIG-A field (for example, the symbols of an HE-STF field, an HE-LTF field, and data) as part of a "Normal UL MU Rx. Procedure," and the HE receiver may indicate that a valid start of a frame, including a valid PLCP header, was received (such as by issuing a PHY-RXSTART.indication primitive). When the WLAN device 200 of FIG. 2 is the HE receiver, the PHY entity may be included in the PHY Processor 222.

In an embodiment, a Signal B (SIG-B) field (such as an HE-SIG-B field) is not present in UL MU transmissions, and the HE receiver may issue the PHY-RXSTART.indication primitive without detecting whether the SIG-B field exists in the received frame.

At S604, when the L-SIG field has the State 0 and the SIG-A field passes the CRC and fails the comparison check, the HE receiver can continue its receiver procedure under the assumption that the received frame is a non-UL-MU frame transmitted by a station that is not involved in the UL MU transmission that the HE receiver had attempted to initiate using the corresponding trigger frame, that is, by a third-party station. The third-party station may be a receiver not in the BSS of the HE receiver, such as the fifth station STA5 of FIG. 1.

In an embodiment, the PHY entity of the HE receiver can interpret this condition as a SIG-A error and can issue the error condition PHY-RXEND.indication(FormatViolation) primitive. The HE receiver may then defer (Act RX.DEFER, such as by not seeking access to the channel and optionally entering a sleep mode or a low power mode) to the end of a time indicated by length information contained in the L-SIG field.

In another embodiment, the HE receiver may process the received frame as a non-UL-MU frame according to an RX.NORMAL procedure (Act RX.NORMAL). The RX.NORMAL procedure may include receiving and decoding a SIG-B field (such as an HE-SIG-B field) or a HE-STF field (in case the received frame does not include an HE-SIG-B field following the HE-SIG-A field), and receiving and decoding following fields including the HE-LTF field, data, and the like.

At S606, when the L-SIG field has the State 0 and the SIG-A field fails the CRC, the HE receiver interprets this as an error in the SIG-A field and the PHY entity of the HE receiver may issue the error condition PHY-RXEND.indication(FormatViolation) primitive. The HE receiver may then defer to the end of a time indicated by length information contained in the L-SIG field.

At S608, when the L-SIG field has the State 1 (indicating that the L-SIG field parity was correct and that the contents of the L-SIG field were not as expected) and the SIG-A field passes the CRC and passes the comparison check, the HE receiver may operate under one of two interpretations.

Under the first interpretation, the HE receiver interprets the received frame as being the expected UL MU transmission. The assumption underlying this interpretation is that because the validity check of the L-SIG field includes a 1 bit parity check, the reliability of the L-SIG validity check is lower than that of the SIG-A validity check, which includes an 8-bit CRC. Accordingly, the HE receiver may ignore the L-SIG validity check result when the SIG-A field passes its validity check, and may process the frame as the expected UL MU transmission using the UL MU receive procedure.

Under the second interpretation, the HE receiver interprets the received frame as a having been transmitted by a third-party station. Even when reception of the received frame begins within a SIFS of the end of the transmission of the trigger frame, there is a chance for the HE receiver to get a frame targeting the HE receiver from a third-party station. Therefore, the HE receiver may perform one of the Act RX.NORMAL and the Act RF.DEFER, as described at S604, above.

In an embodiment, the HE receiver determines whether to use the first interpretation or the second interpretation according to length information. For example, if a decoded length determined using length information present in the received frame is longer than an expected length of an UL MU frame, the HE receiver may choose to use the first interpretation (Interpretation 1) and perform the UL MU receive procedure using the expected length. Otherwise, the HE receiver may choose to use the second interpretation (Interpretation 2). The HE receiver chooses which interpretation to use in this manner because the expected length is more reliable information than the decoded length and with the objective of minimizing the impact when the interpretation chosen is incorrect.

At S610, the HE receiver may determine that the received frame is a frame transmitted by a third-party station when the L-SIG field has the State 1, the SIG-A field has passed the CRC, and the SIG-A field has failed the comparison check. Therefore, the HE receiver may perform one of the Act RX.NORMAL and the Act RF.DEFER, as described at S604, above.

At S612, when the L-SIG field has the State 1 and the SIG-A field has not passed the CRC, the HE receiver determines that a SIG-A error has occurred and the PHY entity of the HE receiver may issue the error condition PHY-RXEND.indication(FormatViolation) primitive. The HE receiver may then defer to the end of a time indicated by length information contained in the L-SIG field.

At S614, when the L-SIG field has the State 2 (indicating that the L-SIG field parity was incorrect) and the SIG-A field passes the CRC and comparison check, the HE receiver may behave according to one of two interpretations.

Under the first interpretation, the HE receiver interprets the received frame as being the expected UL MU transmission. The assumption underlying this interpretation is that because the validity check of the L-SIG field includes a 1 bit parity check, the reliability of the L-SIG validity check is lower than that of the SIG-A validity check, which includes an 8-bit CRC. Accordingly, the HE receiver may ignore the L-SIG validity check result when the SIG-A field passes its validity check, and may process the frame as the expected UL MU transmission using the UL MU receive procedure.

Under the second interpretation, the HE receiver interprets the received frame as being in error and may begin performing Clear Channel Assessment (CCA).

At S616, when the L-SIG has the State 2 and the SIG-A field passes the CRC but fails the comparison check, the HE receiver may begin performing CCA.

At S618, when the L-SIG has the State 2 and the SIG-A field fails the CRC, the HE receiver may begin performing CCA.

In an embodiment, an HE receiver which had sent a trigger frame may skip one of the L-SIG field validation and the SIG-A field validation or may skip both because the HE receiver knows the contents in L-SIG and SIG-A. Therefore, the HE receiver may perform one of a first behavior and a second behavior when the HE receiver expects a received frame to be a triggered UL MU transmission.

In the first behavior according to an embodiment, the HE receiver may not perform one of the parity check of the L-SIG field and the CRC of the SIG-A field when receiving a frame that the HE receiver expects to be an UL MU transmission. A PHY entity of the HE receiver may indicate that a valid start of a frame, including a valid PLCP header, was received when i) a frame is detected within a predetermined period of time, such as a SIFS, after the final symbol of the trigger frame is transmitted and ii) one of the validity check of the L-SIG field and the validity check of the SIG-A validity is successfully performed. The validity check performed may include a comparison check that compares a content of the received field with an expected content. The PHY entity way indicate the valid start of the frame the using a PHY-RXSTART.indication primitive.

Table 3, below, gives an example of the first behavior in which only the validity of the L-SIG field is checked. The respective behaviors correspond to the like-named behaviors of Table 2 of FIG. 6, described above.

TABLE 3

Behaviors for UL MU in HE, when a receiver consider only L-SIG

| L-SIG State | L-SIG Parity | L-SIG Comp. | Interpretation | Behavior |
|---|---|---|---|---|
| 0 | OK | Same | UL MU PPDU | Act RX.ULMU: Continue an UL MU Rx. procedure, issuing PHY-RXSTART.indication primitive after detecting SIG-A (without HE-SIG-B existence if there is no HE-SIG-B in UL MU) |
| 1 | OK | Different | Third-party PPDU | Option 1: Act RX.NORMAL: Continue using a RX.NORMAL procedure (non-UL-MU procedure) Option 2: Act RX.DEFER: Defer using L-SIG.LENGTH |
| 2 | NOK | — | L-SIG Error | Back to CCA |

When L-SIG parity check is passed and the L-SIG comparison check is also passed, the PHY entity in the HE receiver shall begin receiving symbols following the SIG-A field, for example, symbols corresponding to a HE-STF field, a HE-LTF field, and data. When the received frame is an UL MU transmission, a SIG-B field, which might ordinarily include some part of station-specific information, can be omitted in the UL MU Rx.Procedure, which may be called a "Normal UL MU Rx. Procedure."

When the L-SIG parity check is passed and the L-SIG comparison check is not passed, the receiver may determine that the received frame is a third-party frame that by chance has been directed to the HE receiver. The HE receiver may perform one of two behaviors in this case: 1) defer to the time indicated by length information in the L-SIG field, or 2) continue the receive procedure after determining that the received frame is a non-UL-MU frame. When a frame that is determined to be a non-UL-MU frame is received, a SIG-B decoding process is performed which is not performed when a frame that has been determined to be a UL MU frame is received. In another embodiment, a STF decoding process is performed when a frame that has been determined to be a UL MU frame is received.

When both L-SIG parity check and comparison check are failed, the receiver goes to Clear Channel Assessment (CCA) and waits to find an idle slot.

In a second possible behavior according to an embodiment, the HE receiver when receiving a frame that the HE receiver expects to be an UL MU transmission performs neither the parity check of the L-SIG field nor the CRC of the SIG-A field. The HE receiver may indicate, without performing validity checks for either of the L-SIG field of the SIG-A field, that a valid start of a frame was received (such as by issuing the PHY-RXSTART.indication primitive) when a frame is detected within a predetermined period of time, such as a SIFS, after the final symbol of a triggering frame is transmitted. An RXVECTOR of the PHY-RX-START.indication primitive may be generated according to the known (that is, the expected) L-SIG and SIG-A information for the received UL MU frame.

In addition to an HE receiver that is expecting a triggered UL MU transmission having different behavior compared to HT receivers and VHT receivers, a HE receiver that is not involved in a UL MU operation (that is, a third-party receiver) may have a different behavior when receiving an UL MU transmission. For example, when the third-party receiver detects that a received frame is a UL MU frame, such as by decoding a SIG-A field, the third-party receiver may skip decoding of a SIG-B field and may then defer to the end of a time according to length information of a L-SIG field of the received frame, if the length information is available.

FIG. 7 illustrates a process 700 for receiving a frame according to an embodiment. The process may be performed by a High Efficiency (HE) receiver. In an embodiment, the process 700 starts when the HE receiver has a receive-idle state and detects energy in a channel. The HE receiver may have set an indication of the Clear Channel Assessment state of the PHY entity of the HE receiver (hereinafter, a PHY_CCA indication) to a BUSY value before starting the process 700.

At S702, the process 700 detects and receives a Legacy Signal (L-SIG) field of the received frame. In an embodiment, the HE receiver detects and receives the L-SIG field after determining that the symbols corresponding to the L-SIG field do not correspond to a High Throughput Signal (HT-SIG) field of a High Throughput Greenfield preamble.

The process 700 may then detects a format of the received frame, such as whether the frame is formatted as a High Throughput (HT) frame according to IEEE Std 802.11n, as a Very High Throughput (VHT) frame according to IEEE Std 802.11ac, or as a High Efficiency (HE) frame. In an embodiment, the format of the frame may be determined according to whether the L-SIG field is duplicated and according to phase rotations of symbols following a last L-SIG field.

At S704, the process 700 checks whether the format of the received frame indicates that the frame is an HE frame. When the received frame is the HE frame, the process 700 proceeds to S708. Otherwise, the process 700 proceeds to S706.

At S706, the process 700 receives a non-HE frame, such as a Legacy (non-HT), HT, or VHT frame according to the 802.11n or 802.11ac standards. If during S706 an L-SIG Parity check fails, the process 700 proceeds to S712.

At S708, the process 700 determines whether the parity of the L-SIG field is correct. When the parity of the L-SIG field is correct, the process 700 proceeds to S718. Otherwise, at S704 the process 700 proceeds to S710.

At S710, the process 700 determines whether the HE receiver is expecting an UpLink Multi-User (UL MU) frame such as an UL MU Orthogonal Frequency Division Multiple Access (OFDMA) frame. The HE receiver may expect the received frame to be the UL MU frame when reception of the received frame started within a predetermined period of time, such as a Short Inter-Frame Space (SIFS), after the end of a transmission of a trigger frame by the HE receiver. When the HE receiver is expecting an UL MU frame, the process 700 proceeds to S716 (in spite of the incorrect parity of the L-SIG field). Otherwise, at S706 the process 700 proceeds to S712.

At S712, the process 700 sets the PHY_CCA indication according to a CCA sensitivity and a signal strength of the received frame. The process 700 then causes the HE receiver to have a receive-idle (RX IDLE) state.

At S716, the process 700 receives and decodes an HE Signal A (HE-SIG-A) field of the received frame. In another embodiment, when the receiver is a non-AP Station, the process 700 defers (such as by not seeking access to the channel and optionally go to sleep mode or low power mode) to the end of a time indicated by length information contained in the L-SIG field when the received frame is determined as a UL frame such as an UL MU frame and a UL SU frame based on an information or indication included in the HE-SIG-A.

At S718, the process 700 preforms a Cyclic Redundancy Check (CRC) of the HE-SIG-A field. When the CRC is correct, the process 700 proceeds to S722. Otherwise, at S718 the process 700 proceeds to S720.

At S720, the process 700 determines whether the parity of the L-SIG field is correct. When the parity of the L-SIG field is correct, the process 700 process proceeds to S726. Otherwise, at S720 the process 700 proceeds to S712.

At S722, the process 700 performs a content check of the HE-SIG-A field. The content check may include determining a mode of the frame. The mode of the frame may include a Modulation and Coding Scheme (MCS) and a number of spatial streams.

In an embodiment, the content check for the HE-SIG-A field may include comparing, to corresponding expected values, one or more fields of the HE-SIG-A field such as:
  a bandwidth field indicating an operating bandwidth,
  an indication bit indicating whether the frame is the UL-MU transmission or not, or whether the frame is UL transmission or DL transmission (frame format indication),
  a Space Time Block Coding (STBC) field indicating whether the Physical Layer Convergence Procedure (PLCP) Protocol Data Unit (PPDU), that is, the frame, applies STBC,
  a Group ID field indicating a group which includes a STA related to the received frame,
  a BSS Color field indicating an identifier of the BSS which the frame belongs to,
  a Spatial Reuse field indicating a CCA level, interference level accepted or TX power,
  a NSTS field indicating a number of streams of a single or multiple STAs,
  a Coding field indicating a coding type of the received frame,
  a Modulation and Coding Scheme (MCS) field indicating an MCS of a single or multiple STAs,
  a beamforming field indicating if the received frame applies beamforming,
  a GI field indicting a type of a length of CP, and
  a TXOP Duration field indicating the remaining time in the current TXOP.

When the HE receiver expects the received frame to be an UL MU frame, the content check at S722 may include a content comparison that determines whether contents of the HE-SIG-A field match expected contents of the HE-SIG-A field. The HE receiver expects the received frame to be the UL MU frame when reception of the received frame started within a predetermined period of time, such as a Short Inter-Frame Space (SIFS), after the end of a transmission of a trigger frame by the HE receiver.

At S724, when the content check of the HE-SIG-A field indicates that all or part of the received contents matched the corresponding respective content, the process 700 proceeds to S734. Otherwise, at S724 the process 700 proceeds to S728.

At S726, the process 700 defers by waiting a period of time corresponding to a predicted time until the end of the expected UL MU frame. After the predicted time, the process 700 sets the PHY_CCA indication to an IDLE value and causes the HE receiver to have the RX IDLE state.

At S728, the process 700 determines whether the parity of the L-SIG field is correct. When the parity of the L-SIG field is correct, the process 700 process proceeds to S730. Otherwise, at S728 the process 700 proceeds to S712.

At S730, the process 700 determines whether the HE-SIG-A field indicates a mode that is supported by the HE receiver and whether to filter out the received frame. The determination of whether to filter the received frame out may be made according to values of a PHYCONFIG_VECTOR. For example, the received frame may be filtered out according to one of a membership status in a group ID, a partial Association ID (AID), whether a Group ID of the frame is 0, and the like.

When the received frame is filtered out or the HE-SIG-A field indicates a mode that is not supported by the HE receiver, at S730 the process 700 proceeds to S726. Otherwise, at S730 the process 700 proceeds to S732.

At S732, the process 700 receives the rest of the received frame. Receiving the rest of the received frame may include i) determining a number of symbols to receive, ii) receiving the number of symbols, and iii) setting the PHY_CCA indication to IDLE and the HE receiver to have the RX IDLE state after the number of symbols are received.

At S734, the process 700 receives the rest of the received frame as an UL MU frame. Receiving the rest of the received frame as an UL MU frame may include i) determining a number of symbols to receive, ii) receiving the number of symbols, and iii) setting the PHY_CCA indication to IDLE and the HE receiver to have the RX IDLE state after the number of symbols are received.

Figure 8:
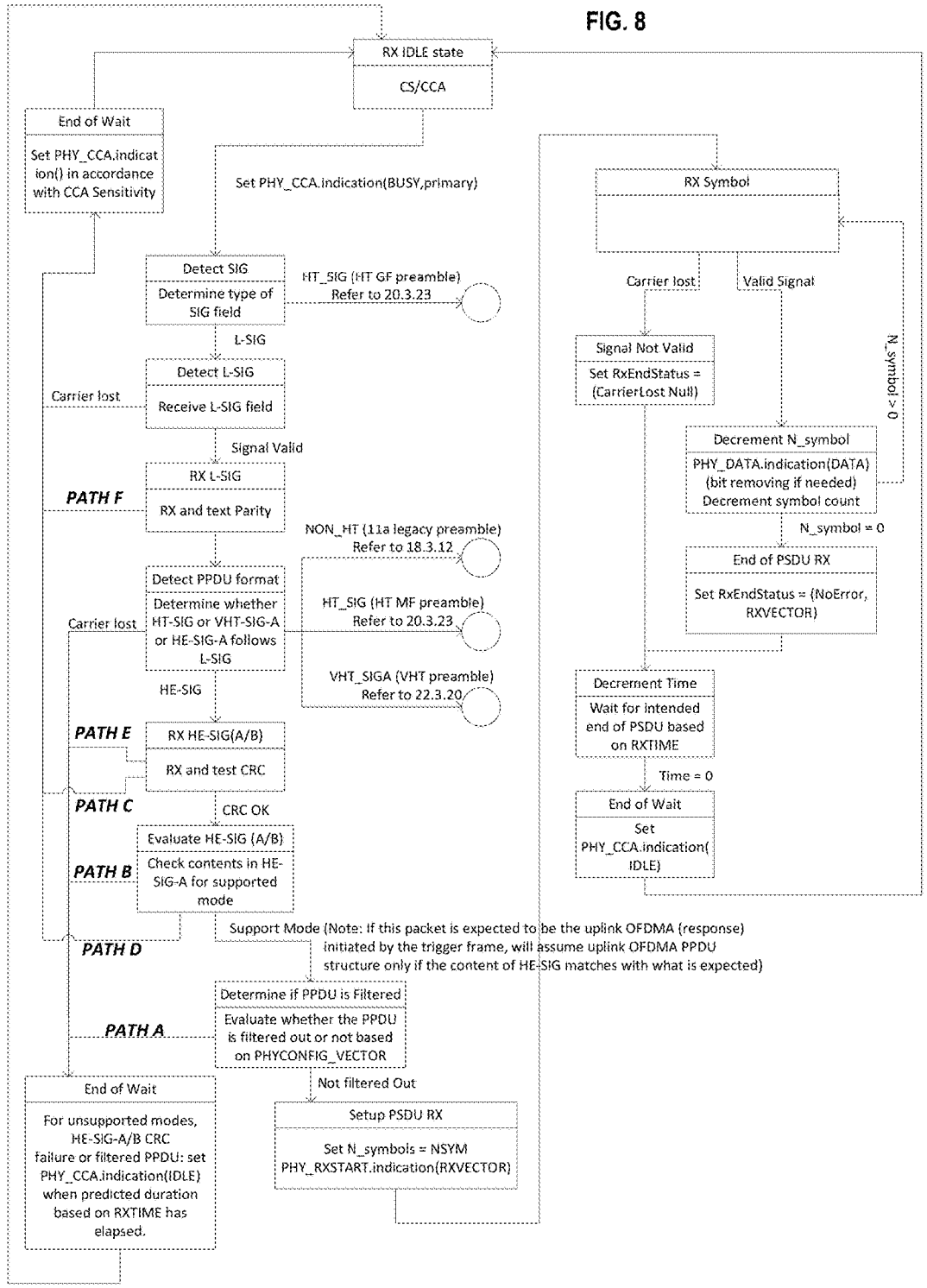
FIG. 8 is a state machine diagram illustrating a receiver behavior according to an embodiment.

FIG. 8 is a diagram of a PHY state machine illustrating a receiver behavior of an HE receiver according to an embodiment.

PATH A is followed when a frame is filtered out. The HE receiver may perform the PHY_RXSTART.indication (RXVECTOR) primitive and then sets PHY_RXEND.indication(Filtered). In an embodiment, the PATH A may also be followed if the packet is expected to be an UL OFDMA response initiated by a trigger frame, and the L-SIG LENGTH parameter is set to what is expected but HE-SIG contents (such as contents of an HE-SIG-A field) are different than what is expected.

PATH B may be followed when the HE-SIG-A field indicates a mode not supported by the HE receiver. The HE receiver may perform the PHY_RXSTART.indication (RXVECTOR) primitive and then set PHY_RXEND.indication(UnsupportedRate) or, when an Invalid L-LENGTH condition occurs, set PHY RXEND.indication(FormatViolation).

PATH C may be followed when an L-SIG Parity test fails and an HE-SIG CRC test (such as a CRC test of an HE-SIG-A field) fails.

PATH D may be followed when the received packet is expected to be the uplink OFDMA (response) initiated by the trigger frame, the L-SIG Parity test fails, and the HE-SIG field does not contain the expected uplink OFDMA RXVECTOR configuration.

PATH E may be followed when the L-SIG parity test passes and the HE-SIG CRC test fails.

PATH F may be followed when the received packet is not expected to be the UL OFDMA response initiated by the trigger frame and the L-SIG Parity test fails.

HE receiver behaviors related to UL MU transmissions are disclosed herein. The behavior of the HE receiver for an UL MU frame differs from the behavior of the HE receiver for a non-UL-MU frame, in accordance with the different preamble structure of the UL MU frame.

The different HE receiver behavior can be differentiated by a signaling bit included in the known bit position in an SIG-A field, such as an HE-SIG-A field. The signaling bit may be included in an HE-SIG-A field of an UL MU PPDU.

The different HE receiver procedure can be differentiated by validity check results of L-SIG and SIG-A fields.

In an embodiment, a PHY entity of the HE receiver may check a validity of an L-SIG field, a validity of a SIG-A field, or both of a frame received within a SIFS after sending a trigger frame for UL MU transmission. Checking the L-SIG field includes performing a parity check of the L-SIG field and comparing full or partial contents of the L-SIG field to first expected values. Checking the SIG-A field includes performing a Cyclic Redundancy Check (CRC) of the SIG-A field and comparing full or partial contents of the SIG-A field to second expected values. The first expected values, the second expected values, or both may correspond to information sent in the trigger frame.

When the L-SIG field of a received UL MU frame has a correct parity but has different contents that the HE receiver expected, the HE receiver can perform the normal UL MU receiving procedure if the SIG-A field is determined to be correct by the corresponding CRC and content comparison.

When the SIG-A CRC and the L-SIG parity check are both passed but the L-SIG field and the SIG-A field both have different contents than the respective expected contents, the HE receiver may perform a non-UL-MU receiving procedure even though the frame was received within a SIFS after sending the trigger frame.

When the receiver has different length information between first length information sent in a trigger frame and second length information received in a frame received within a SIFS of the transmission of the trigger frame, the receiver may make a decision of defer (wait to the end of the current transmission) depending on the difference between the first length information and second length information.

The above explanation and figures are applied to an HE receiver, an HE frame, an HE PPDU, an HE-SIG field and the like of the IEEE 802.11ax amendment, but they can also applied to a receiver, a frame, PPDU, a SIG field, and the like of the next amendment of IEEE 802.11.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method implemented by a wireless communication device for receiving a frame, the method comprising:
   transmitting, by the wireless communication device, a first frame that solicits an Up-Link Multi-User (UL MU) frame;
   determining, by the wireless communication device, whether a second frame the UL MU frame solicited by the first frame;
   receiving the second frame by performing a first procedure in response to determining that the second frame is the solicited UL MU frame; and
   receiving the second frame by performing a second procedure in response to determining that the second frame is not the solicited UL MU frame,
   wherein performing the first procedure includes performing a comparison of contents of a Legacy Signal (L-SIG) field of the second frame to expected contents of the L-SIG field of the second frame, performing a comparison of contents of a Signal A (SIG-A) field of the second frame to expected contents of the SIG-A field of the second frame, or both,
   wherein performing the comparison of the contents of the L-SIG field to the expected contents of the L-SIG field includes comparing a value of a LENGTH field of the L-SIG field of the second frame to an expected value of the LENGTH field, comparing a value of a rate field of the L-SIG field of the second frame to an expected value of the rate field, or both, and
   wherein performing the comparison of the contents of the SIG-A field to the expected contents of the SIG-A field includes one or more of:
      comparing a value of a bandwidth field of the SIG-A field indicating an operating bandwidth to an expected value of the bandwidth field,
      comparing a value of a Spatial Reuse field of the SIG-A field indicating a Clear Channel Assessment (CCA) level, an interference level accepted, or a transmission (TX) power to an expected value of the Spatial Reuse field,
      comparing a value of a Space Time Block Coding (STBC) field of the SIG-A field indicating whether the second frame applies STBC to an expected value of the STBC field,
      comparing a value of a Group Identifier (ID) field of the SIG-A field indicating a group which includes a station related to the second frame to an expected value of the Group ID field,
      comparing a value of a Number of Space-Time Streams (NSTS) field of the SIG-A field indicating a number of space-time streams to an expected value of the NSTS field,
      comparing a value of a Coding field of the SIG-A field indicating a coding type of the second frame to an expected value of the Coding field,
      comparing a value of a Modulation and Coding Scheme (MCS) field of the SIG-A field indicating a MCS of the second frame to an expected value of the MCS field,
      comparing a value of a beamforming field of the SIG-A field indicating if the second frame applies beamforming to an expected value of the beamforming field,
      comparing a value of a Transmission Opportunity (TXOP) Duration field of the SIG-A field indicating the remaining time in the current TXOP to an expected value of the TXOP Duration field, and
      comparing a value of a Guard Interval (GI) field of the SIG-A field indicting a type of a length of a Cyclic Prefix (CP) of the second frame to an expected value of the GI field.

2. The method of claim 1, further comprising:
   determining the second frame to be the solicited UL MU frame when a reception of the second frame by the wireless communication device begins a Short Inter-Frame Space (SIFS) after a completion of the transmission of the first frame.

3. The method of claim 1, further comprising:
   performing a validity check of the L-SIG field of the second frame; and
   determining whether the second frame is the solicited UL MU frame according to a result of the validity check of the L-SIG field.

4. The method of claim 1, further comprising:
   performing a validity check of the SIG-A field of the second frame; and
   determining whether the second frame is the solicited UL MU frame according to a result of the validity check of the SIG-A field.

5. The method of claim 1, wherein the SIG-A field includes a High Efficiency (HE) Signal A (HE-SIG-A) field.

6. The method of claim 1, further comprising:
   wherein the first frame includes an indication of the expected contents of the SIG-A field.

7. The method of claim 1, further comprising:
   determining the second frame is the solicited UL MU frame when the contents of the SIG-A field match the expected contents of the SIG-A field; and
   determining the second frame is not the solicited UL MU frame when the contents of the SIG-A field are different from the expected contents of the SIG-A field.

8. The method of claim 7, further comprising:
   performing a validity check of the L-SIG field of the second frame; and
   determining the second frame is a third-party frame when a result of the validity check of the L-SIG field indicates that the contents of the L-SIG field match the expected contents of the L-SIG field and the contents of the SIG-A field are different than the expected contents of the SIG-A field.

9. The method of claim 7, further comprising:
   performing a validity check of the L-SIG field of the second frame; and
   determining the second frame is a third-party frame when a result of the validity check of the L-SIG field indicates that the contents of the L-SIG field do not match the expected contents of the L-SIG field.

10. The method of claim 9, further comprising:
    determining that the second frame is the solicited UL MU frame when i) the result of the validity check of the L-SIG field indicates that the contents of the L-SIG field do not match the expected contents of the L-SIG field, and ii) a length indicated in the second frame is longer than an expected length of the second frame; and
    determining that the second frame is the third-party frame when the result of the validity check of the L-SIG field indicates that the contents of the L-SIG field do not match the expected contents of the L-SIG field and a length indicated in the second frame is not longer than an expected length of the second frame.

11. The method of claim 9, further comprising:
determining that the second frame is not the solicited UL MU frame when i) a reception of the second frame by the wireless communication device begins a Short Inter-Frame Space (SIFS) after a completion of the transmission of the trigger first frame, ii) the validity check of the L-SIG field indicates that the contents of the L-SIG field are different than the expected contents of the L-SIG field, and iii) the contents of the SIG-A field are different than the expected contents of the SIG-A field.

12. The method of claim 7, further comprising:
performing a validity check of the L-SIG field of the second frame; and
determining that an error has occurred according to a result of the validity check of the L-SIG field.

13. The method of claim 1, further comprising:
determining that an error has occurred when the contents of the SIG-A field compared during performing the comparison of the contents of the SIG-A field to the expected contents of the SIG-A field are different from the expected contents of the SIG-A field.

14. The method of claim 1, further comprising:
performing a parity check of the L-SIG field of the second frame; and
performing the first procedure when the second frame is determined to be the UL MU frame and a result of the parity check of the L-SIG field indicates a parity error.

15. The method of claim 1, further comprising:
indicating, using an indication included in an High Efficiency Signal A (HE-SIG-A) field, that the wireless communication device may perform the first procedure.

16. The method of claim 1, further comprising:
performing a comparison of a length indicated in the second frame to an expected length; and
determining whether to wait to an end of a current communication according to a result of the comparison.

17. The method of claim 1, wherein the second frame is an Orthogonal Frequency Division Multiple Access (OFDMA) frame.

18. The method of claim 17, wherein the L-SIG field of the second frame and the SIG-A field of the second frame are a result of an air combination of a plurality of transmitted frames, the plurality of transmitted frames being respectively transmitted by a plurality of wireless devices.

* * * * *